Patented Sept. 11, 1923.

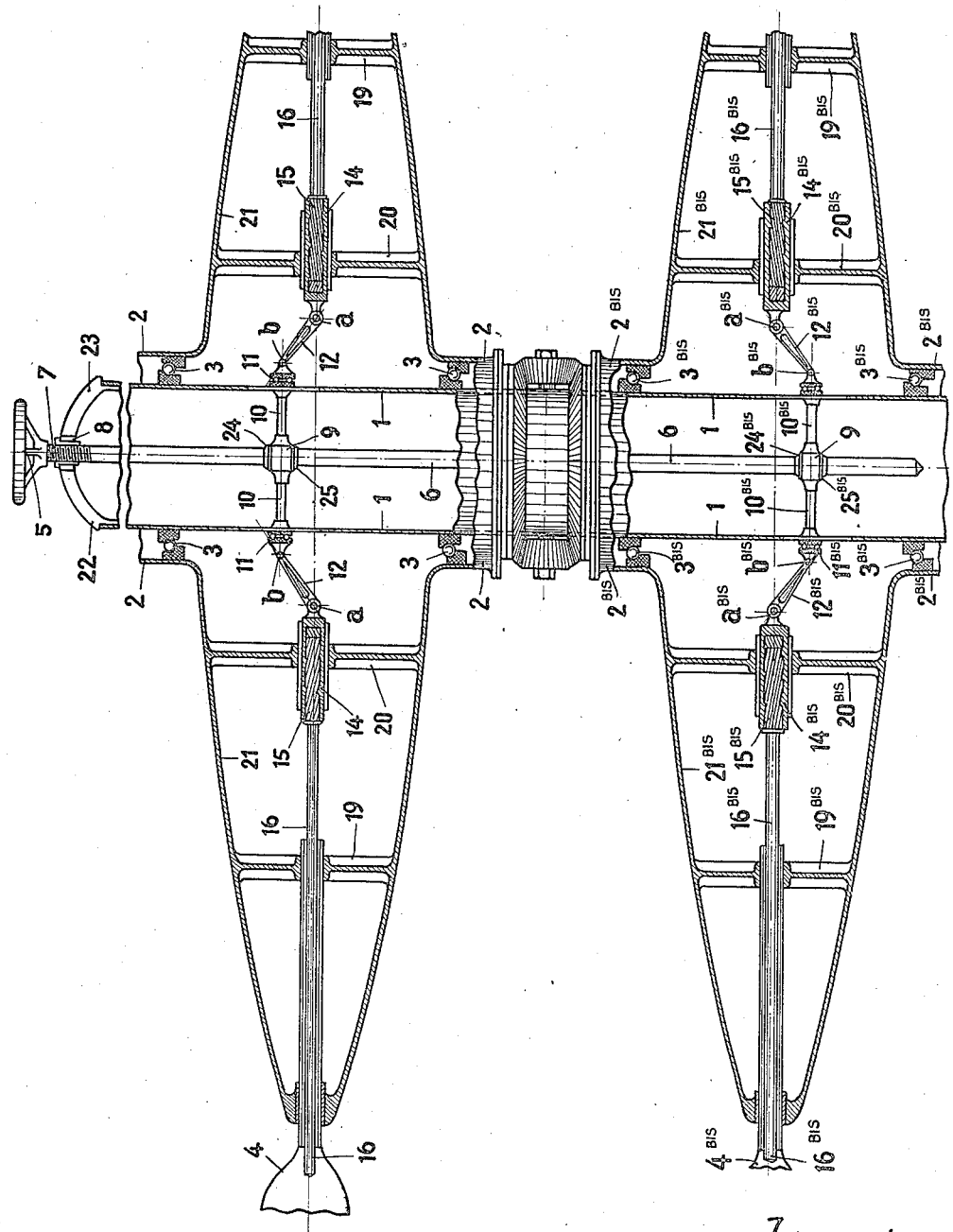

1,467,648

UNITED STATES PATENT OFFICE.

RAUL PATERAS PESCARA, OF BARCELONA, SPAIN.

SYSTEM OF PROPELLERS WITH DIFFERENTIAL TWIST BETWEEN THE PROPELLERS FOR AIRCRAFT OF THE HELICOPTER TYPE.

Application filed July 15, 1920. Serial No. 396,595.

*To all whom it may concern:*

Be it known that I, RAUL PATERAS PESCARA, a citizen of the Argentine Republic, residing at Calle de la Buena Suerte No. 20, Barcelona, Spain, have made certain new and useful Invention for a System of Propellers with Differential Twist Between the Propellers for Aircraft of the Helicopter Type (for which I have filed an application in Spain, June 28, 1919), of which the following is a specification.

In helicopter aircraft, the word propeller is used to designate any part intended to exert a thrust along an axis by means of rotation of surface constructed with or without helicoidal pitch.

Up to the present the solution of the problem of the helicopter has always been dealt with by means of the use of one or several systems of propellers revolving in opposite directions. The object of such arrangement is to eliminate the movement of rotation upon itself which the apparatus would undergo under the action of a single propeller. Nevertheless it appears that this arrangement is insufficient to ensure stability of position because it is evident that propellers cannot be constructed with absolute accuracy and consequently slight differences in their angles of impact may exist. These differences of incidence between the two propellers revolving in opposite directions will therefore perforce entail more or less rapid rotation of the apparatus on itself.

On the other hand, it is indispensable that the helicopter should change in direction to effect a turn and then it becomes necessary to make it perform the movement of rotation on itself.

The system of propellers with differential twist between the propellers for aircraft of the helicopter type which forms the subject of the present application for patent, is intended to correct these movements of rotation by the apparatus on itself, movements due to any inequality in the resistance to rotation of the aircraft propellers. It also serves to produce the same rotation in the turns.

Generally speaking, I mean by twist of the blades of the propeller, a mechanical action which consists in bringing about a variation in the angle of impact of the surfaces constituting the blades in such manner that this variation affects only part of lesser or greater extent of the total surface of the said blades.

This definition indicates that the twist in its essence is a partial increase or reduction of the angle of impact. If therefore in an apparatus of the helicopter type fitted with one or several systems of two propellers, each of them revolving in opposite directions, I increase by means of twist (that is to say, partially) the angles of impact of the blades of the other propeller, I obtain the turn which I have described by the name of differential twist between the propellers.

It is evident that this operation, very appreciable in its effects and greatly reduced in ratio, will allow of equalizing the moment of resistance of the two propellers and eliminating the effect of unequal reactions. At the same time it will be understood that it could also in this way give rise to such inequality in order to change the direction of the apparatus in turns.

The following mechanical device allows of carrying it into effect in practice. I shall point out above all that the effects of twist may be obtained in several equivalent ways, for instance by change of the curve of the profile of the blade or again by means of wings. Generally I denote by twist agency any device which, by its direct action on the air, tends to bring about a variation in the angle of impact or thrust in a partial region of the surface of the blades.

The mechanisms I am about to describe have for their object the control, from the centre of the differential twist propellers, of a wing which can be directed by rotation and which I have chosen as a type by way of example.

The annexed drawing represents a vertical section of the control arrangement. The blades of the propeller 4 and of the other propeller $4^{bis}$ revolving in opposite directions are respectively supported from two hubs 2 and $2^{bis}$ by stays such as 19, $19^{bis}$, 20 and $20^{bis}$ themselves fixed to two casings 21 and $21^{bis}$.

The hubs 2 and $2^{bis}$ are movable about the central tube 1 (which forms the axis of the apparatus) by means of the ball bearings 3 and $3^{bis}$. Inside the tube 1 there will be observed a rod 6 ending in a handwheel 5, which forms the control under the command of the pilot.

This rod 6, of circular section, is provided at 7 with a screw thread which engages in a nut 8 supported in the tub 1 by stays 22 and 23. On the other hand the rod 6 carries, in the plane of rotation of each propeller, two rings 9 and $9^{bis}$, which are held by flanges 24 and $24^{bis}$ and 25 and $25^{bis}$ and carry arms 10 and $10^{bis}$ which, through the central tube 1, terminate in internal bearings of the ball bearings 11 and $11^{bis}$. These bearings can slide along the tube 1, which serves as their guide in this movement.

Into the external rings of these bearings there are pin jointed at $b$ and $b^{bis}$ opposite each blade, small connecting rods 12 and $12^{bis}$.

The other pin joints $a$ and $a^{bis}$ connect these connecting rods to sleeves 14 and $14^{bis}$, the outside of which is provided with rectilinear grooves engaging in corresponding grooves of the supports 20 and $20^{bis}$. Inside they are provided with a screw thread of large pitch engaged by corresponding threads on the rods 15 and $15^{bis}$.

Finally, the tubes 16 and $16^{bis}$ are joined to these last rods 15 and $15^{bis}$. Afterwards passing through the entire length of the blade they are rigidly connected to the spindles of rotation of the twist agencies.

The mechanism therefore comprises two parts. The first part fixed and connected with the central tube, which is constituted by the pieces 5, 6, 7, 8, 9, $9^{bis}$, 10, $10^{bis}$. The other part is carried along in the movement of rotation of the propellers and is constituted by the pieces 12, $12^{bis}$, 13, $13^{bis}$, 14, $14^{bis}$, 15, $15^{bis}$, 16, $16^{bis}$. The ball bearing 11 allows of connecting these two parts of the mechanism.

This being laid down let it be supposed the propellers are in operation. In order to produce the effects of differential twist between the propellers it is sufficient for the pilot to operate the hand wheel 5 in any direction. The screw thread 7 will immediately, for instance, cause the rod 6 to rise with it the parts 9, $9^{bis}$, 10, $10^{bis}$, 11, $11^{bis}$. The sleeves 14 and $14^{bis}$ are compelled to draw near to the axis of the apparatus and as their outside grooves prevent them rotating on themselves it is the rods 15 and $15^{bis}$ which will undergo a movement of rotation about their axis, this movement being transmitted to the twist agency by the action of the tube 16.

The drawing renders it clearly evident that these rotations of the twisting agency will be in a given direction for the propeller 4 and simultaneously in an opposite direction for the propeller $4^{bis}$ owing to the opposite inclination of the connecting rods 12 and $12^{bis}$.

Therefore if the movement of the spindle 16 corresponds to an increased angle that of the spindle $16^{bis}$ will produce a reduction of angle. Thus there will be secured the differential twist between the corresponding blades of the propellers. The same will be the case in all the other blades. An opposite movement of the hand-wheel will produce an opposite differential twist.

What I claim is:

1. In a helicopter a pair of propellers arranged for simultaneous rotation in reverse directions and each having a blade provided with a movable portion and means to operate said movable portions to partially increase the angle of impact of the said blade of one of the propellers and reduce the angle of impact of the said blade of the other propeller.

2. In a helicopter a pair of propellers arranged for simultaneous rotation in reverse directions and each having a blade provided with a movable portion and means to simultaneously operate said movable portions to partially increase the angle of impact of the said blade of one of the propellers and reduce the angle of impact of the said blade of the other propeller.

3. In a helicopter, a propeller mounted for rotation and having movable blade portions, each provided with a rod having a screw-threaded member, an internally threaded sleeve engaging said threaded member and mounted for axial movement and against rotation, an axially movable control rod, and link connections between said rod and said sleeves to impart axial movement to said sleeves and thereby cause the same and said threaded members to impart movement to said portions.

In testimony whereof I affix my signature in presence of two witnesses.

RAUL PATERAS PESCARA.

Witnesses:
 EUSEBIN GARCIA,
 JOSE CALA, Jr.